United States Patent [19]

Morris et al.

[11] Patent Number: 5,302,805
[45] Date of Patent: Apr. 12, 1994

[54] WELDING WIRE PRESSURE SENSOR ASSEMBLY

[75] Inventors: Timothy B. Morris, Scottsboro; Peter F. Milly, Sr.; J. Kevin White, both of Huntsville, all of Ala.

[73] Assignee: The United States of America as represented by the Administrator of the National Aeronautics and Space Administration, Washington, D.C.

[21] Appl. No.: 70,132

[22] Filed: May 27, 1993

[51] Int. Cl.$^5$ ............................................. B23K 9/12
[52] U.S. Cl. ............................................. 219/137.71
[58] Field of Search ............ 219/137.2, 137.7, 137.71, 219/124.34, 137 PS, 121.47; 228/11, 244

[56] References Cited

FOREIGN PATENT DOCUMENTS

| 2754580 | 6/1979 | Fed. Rep. of Germany ... 219/137.7 |
| 60-56481 | 4/1985 | Japan ............................. 219/124.34 |
| 3-248775 | 11/1991 | Japan ............................. 219/137 PS |

Primary Examiner—Clifford C. Shaw
Attorney, Agent, or Firm—Robert L. Broad, Jr.; Guy M. Miller; John R. Manning

[57] ABSTRACT

The present invention relates to a device which is used to monitor the position of a filler wire relative to a base material being welded as the filler wire is added to a welding pool. The device is applicable to automated welding systems wherein nonconsumable electrode arc welding processes are utilized in conjunction with a filler wire which is added to a weld pool created by the electrode arc. The invention senses pressure deviations from a predetermined pressure between the filler wire and the base material, and provides electrical signals responsive to the deviations for actuating control mechanisms in an automatic welding apparatus so as to minimize the pressure deviation and to prevent disengagement of the contact between the filler wire and the base material.

16 Claims, 1 Drawing Sheet

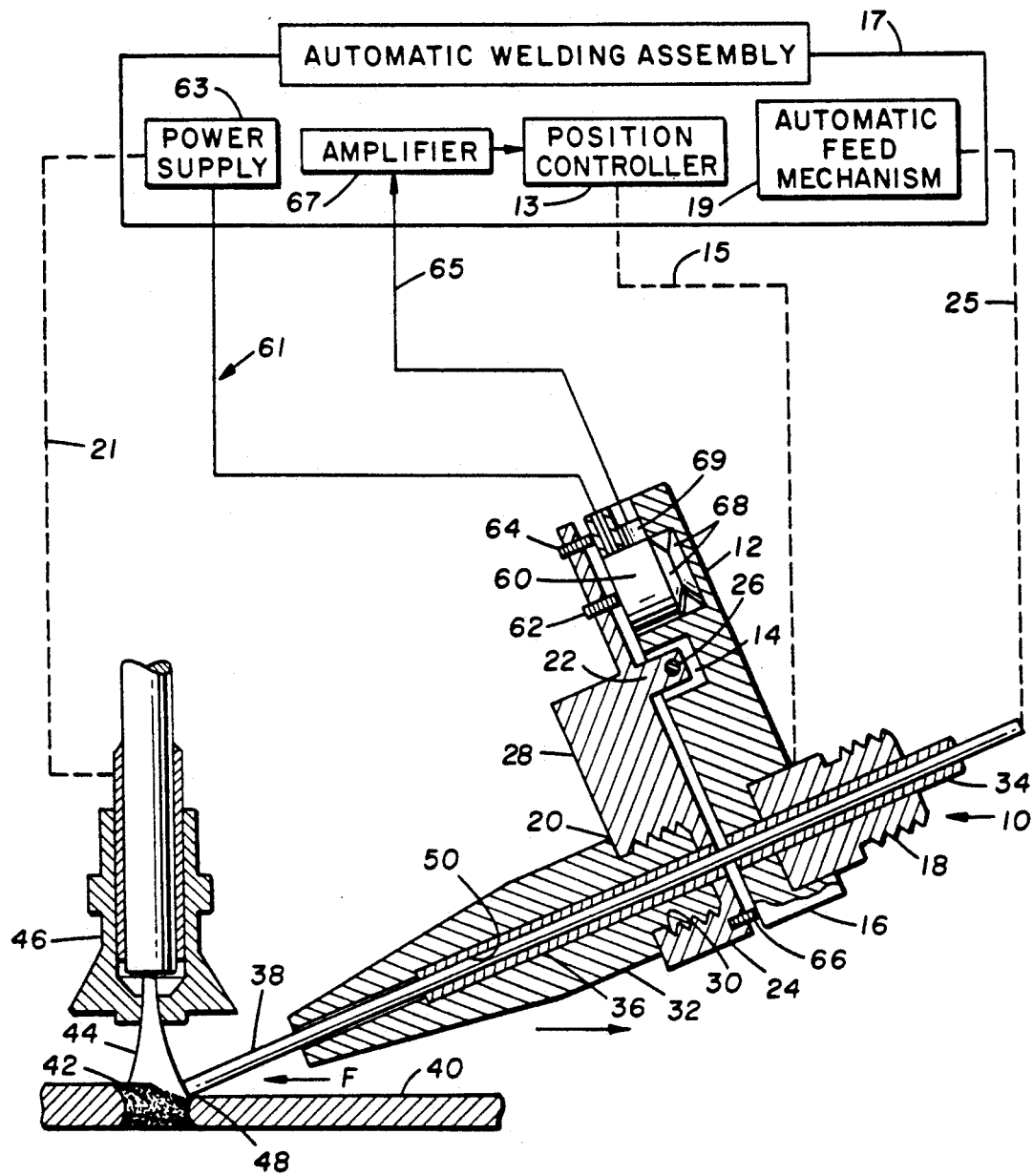

WELDING WIRE PRESSURE SENSOR ASSEMBLY

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates generally to automatic welding systems wherein human intervention during operation is to be minimized. More specifically, the invention is a sensing device for the automatic positioning of a filler wire relative to a base material being welded.

2. Description of Related Art

The current method used to maintain a correct positioning of a filler wire on otherwise automated welding systems is by use of a human operator who manually positions the filler wire as he visually monitors its contact with the base material. This is a very difficult and tedious task, particularly during long welds which require a great deal of precision. The operator of such systems must view the weld area through a protective lens due to the intense arc light. From a restrictive viewing position, the operator must visually position the filler wire and must interpert the force being exerted by the filler wire upon the base material by observing the deflection in the wire. This procedure is inaccurate and inconsistent at best due to typical operator error, operator fatigue and to the varying judgment and reaction time of different operators. Prior to this invention, welds required to be performed in a limited space which would not accommodate a person, could not utilize certain welding processes because a human operator was required to position the filler wire manually. Examples of such limited space areas include the areas inside tanks and other vessels.

SUMMARY OF THE INVENTION

The present invention relates to a device which is used to monitor and control the position of a filler wire relative to a base material being welded, as the filler wire is added to a welding pool. The device is applicable to automated welding systems wherein nonconsumable electrode arc welding processes are utilized. In these systems, a filler wire is added to a weld pool created by the electrode arc. Examples of welding processes of this type include Plasma Arc Welding (PAW), Variable Polarity Plasma Arc Welding (VPPAW), and Gas Tungsten Arc Welding (GTAW). In performance of these processes, a filler wire contacts the base material being welded just ahead of the weld pool as the filler wire is being fed into the weld pool. To provide a precision weld, it is important that the filler wire be correctly positioned and that it remains in contact with the base material being welded within a predetermined range of applied pressure. The purpose of the present invention is to automatically sense pressure deviations from a predetermined pressure between the filler wire and the base material, and to provide electrical signals responsive to the deviations, for actuating control mechanisms in an automatic welding apparatus. In response to these signals the control mechanisms position the filler wire so as to prevent disengagement of the contact between the filler wire and the base material, thereby eliminating the need for manual weld wire positioning and providing a high quality weld.

It is therefore an objective of this invention to overcome limitations of the existing art by use of a unique pressure sensor assembly which provides signals for the automatic positioning a filler wire relative to a base material being welded.

It is another objective of this invention to provide a welding wire pressure sensor assembly which is capable of providing accurate signals for the automatic positioning of a welding filler wire so as to provide a great improvement in the consistency and quality of the welds being formed.

These and other objectives of the invention will be apparent to one skilled in the art from the following detailed description of a specific embodiment thereof.

BRIEF DESCRIPTION OF THE DRAWINGS

The drawing is a sectional view of the invention shown as diagrammatically connected to an automatic welding assembly.

DESCRIPTION OF PREFERRED EMBODIMENT

Referring now to the drawing, the welding wire pressure sensor assembly which is the subject of the invention, is referred to generally by the reference numeral 10. This assembly consists of a base 12 which is mounted to a position controller 13, as illustrated diagrammatically by the dashed connector line 15. The position controller 13 is part of an automatic welding assembly 17 which is the basic assembly to which all illustrated welding apparatus is attached. It is to be understood that the position controller 13 of the automatic welding assembly 17 is capable of positioning the welding wire pressure sensor assembly 10 in response to electrical signals. Such controllers, are well known in the art of automated welding systems, and are utilized in the performance of many of the automatic operations which are performed by such systems. The base 12 includes a base pivot 14 and a base distal end 16. A connector 18 extends from the distal end 16 and is threaded for connection to the automatic welding assembly 17. A tip mechanism 20 includes a tip body 28 having a threaded opening 30 for reception of a threaded tip member 32. The body 28 also includes a tip pivot 22 and a tip distal end 24, and is attached to the base 12 by a pivot pin 26 which passes through the base pivot 14 and the tip pivot 22. A base liner 34 is rigidly fitted to base 12 and passes through the connector 18 and the base distal end 16. A tip liner 36 is rigidly fitted to the tip mechanism 20, and passes through the distal end portion 24 and the tip member 32. A filler wire 38 passes through the base and tip liners 34 and 36 respectively and is slideably fitted therein. As illustrated diagrammatically by the dashed connector line 25, the filler wire 38 is fed through the welding wire pressure sensor 10 by an automatic wire feeding mechanism 19 of the automatic welding assembly 17. It will be noted that the filler wire 38 contacts a base material 40 immediately adjacent a welding pool 42. The welding pool 42 is formed in the base material by the action of an arc 44 emitting from an electrode 46. As diagrammatically illustrated by the dashed connector line 21, the electrode 46 is a part of the automatic welding system 17. As denoted by the directional arrow adjacent the lower end of tip member 32, the automatic welding assembly 17 carries the electrode 46 and the wire pressure sensor 10 along the base material from left to right.

When in proper welding position the wire 38 moves along the base material 40 creating a force F as denoted at the lower end of the filler wire 38. The force F is created as a pressure is applied to the wire 38 it is pressed againast an edge 48, which is the leading edge of the weld pool 42. This force generates a clockwise moment of the tip mechanism 20 about the pivot pin 26. In order to measure this moment a pressure sensitive device, such as an electric load cell 60, is positioned so as to measure the pressure exerted on the load cell 60 by the cloclwise movement. Additionally, it will be noted that the force F is transmitted upwardly by the wire 38 and presses the wire against the back side 50 of the tip liner 36. This force translates to a frictional drag between the tip mechanism 32 and the wire 38. Thus, as the wire 38 is fed through the tip mechanism 20, the frictional drag of the wire 38 on the tip mechanism causes a downward force on the tip mechanism which adds to the clockwise moment about pivot pin 26.

Load cells such as are utilized in this invention are commercially available. In operation, a typical load cell is excited by an external power supply and provides an electrical output which is proportional to the pressure applied to the cell. The output of the cell is utilized to provide signals for actuation of a controller such as is commonly used in automated systems.

As illustrated in the drawing, the load cell 60 is excited through an electrical conductor 61 by a power supply 63. The signal output from the load cell 60 is transmitted via conductor 65 through an amplifier 67 and finally to the position controller 13. A temperature compensator unit 69 is included in the output circuit of the load cell 60 and is located adjacent thereto to electrically correct the output signal of the load cell 60 for variations in ambient temperature which typically accompany the welding process.

Three adjustable screws 62, 64, and 66 are utilized to control and adjust the operation of the load cell 60. The screw 62 is utilized to directly actuate the load cell 60 in response to rotation of the tip mechanism 20 around the pivot 26. The screw 64 is utilized to limit rotation of the tip mechanism to prevent an overload of the load cell 60. And screw 66 is utilized to adjustably rotate the tip mechanism to apply a predetermined preload to the load cell. The preload of the load cell establishes the starting point of a range within which the load cell is to be operated. To permit more deflection per applied load, Belleville spring washers 68 are placed between the load cell and the base 12.

Components utilized in conjunction with the invention such as the amplifier 67 and the temperature compensator 69 are commercially available.

In operation, as the wire 38 moves along the base material 40 the force F will be applied to the wire 38 because of its contact with the base material at edge 48. As pointed out above, this force generates a clockwise moment of the tip mechanism 20 about the pivot pin 26. To measure this moment, the load cell 60 is positioned to measure the pressure on the load cell 60 as caused by the clockwise moment. After being corrected for temperature variations the signal output from the load cell 60 is transmitted via conductor 65 through amplifier 67 and finally to the position controller 13. As pointed out above, the adjustable screws 62, 64 and 66 are utilized for initial adjustments relating to the operation of the load cell 60. More specifically, the screw 62 is adjusted to center the tip mechanism 20 with respect to the base 12 and to directly actuate the load cell 60 in response to rotation of the tip mechanism 28 around the pivot 26. The screw 64 is adjusted to limit rotation of the tip mechanism to prevent a pressure overload being applied to the load cell 60. And screw 66 is adjusted to rotate the tip mechanism so as to apply a predetermined preload to the load cell. The preload of the load cell establishes the starting point of a range within which the load cell is to be operated.

The controller 13 receives the signals from the load cell 60 and controls the position of the assembly 10 in response thereto. The typical scenario for sensor operation is to bring the wire into contact with the base material and then to apply an additional amount of pressure (preload) to the wire. This pressure results in an initial electrical output from the load cell 60. This initial pressure is considered to be the target pressure. The controller then uses a proportional and differential (PD) algorithm to maintain the pressure at this value by moving the assembly 10 in a direction toward the electrode 46 so as to decrease the pressure of the wire 38 against the contact point 48. Alternatively, a similar result will be accomplished if the controller is programmed to rotate the assembly 10 in a clockwise direction so as to decrease the pressure. Thus, if the pressure on the wire increases, the assembly 10 is moved closer to the electrode 46 so as to decrease the pressure of the wire against the pool edge 48 until the target pressure is reached. Conversely, if pressure decreases are sensed, the wire pressure sensor assembly 10 is moved away from the electrode 46 so as to increase the pressure of the wire against the pool edge 48.

Variations in the configuration of the welding wire pressure sensor assembly may be employed to achieve specific desired characteristics in operation. For example, the tip member 32 may be formed in a curved configuration thus providing increased clearance between the welding wire pressure sensor and the automated welding system to which it is attached. This configuration also provides a constant frictional preload within the tip member thus providing a preload of the wire pressure sensor which is desirable for certain applications.

Obviously, numerous other modifications and variations of the present invention are possible in light of the above teachings. It is therefore to be understood that within the scope of the appended claims the invention may be practiced otherwise than as specifically described herein.

We claim:

1. A welding wire pressure sensor assembly adapted for connection to an automatic welding and wire feed system comprising:
    a base disposed for attachment to said automatic welding and wire feed system and having a base wire passage therethrough;
    a tip mechanism pivotally attached to said base and having a tip wire passage therethrough;
    sensing means mounted between said base and said tip mechanism for providing signals to said automatic welding and wire feed system in response to a rotational force applied to said tip mechanism so as to provide a rotational bias of said tip mechanism about said pivotal attachment and against said sensing means and said base as a welding wire is passed through said tip mechanism by said automatic welding and wire feed system.

2. A device as set forth in claim 1 wherein said pivotal attachment is located between said base wire passage and said sensing means.

3. A device as set forth in claim 2 wherein means are provided to apply a preload to said sensing means.

4. A device as set forth in claim 3 wherein means are provided to limit application of force upon said load cell.

5. A device as set forth in claim 4 wherein said sensing means is a load cell.

6. A device as set forth in claim 5 wherein means are provided for amplification of the signals of said load cell.

7. A device at set forth in claim 6 wherein means are provided for temperature compensation of the signals from said load cell so as to maintain accurate signals from said load cell under extreme variations in temperature.

8. A device as set forth in claim 7 wherein spring means are positioned between said load cell and said base.

9. Apparatus for determining and detecting the position of a welding wire with respect to a base material having a weld pool formed therein by an automatic welding mechanism, said determining and detection of the welding wire resulting from interaction of said welding wire with the edge of said weld pool, said apparatus comprising:
   base means for attaching said apparatus to said automatic welding mechanism;
   tip means movably attached to said base means;
   a welding wire passing through said base means and said tip means and forcibly contacting the edge of said weld pool so as to move said tip means with respect to said base means;
   and sensor means for providing control signals to said automatic welding system for controlling the position of said welding wire responsive to movement of said tip means with respect to said base means.

10. Apparatus as set forth in claim 9 wherein said tip means is rotatably attached to said base means.

11. Apparatus as set forth in claim 10 wherein said sensor means is responsive to pressure applied thereto by said tip means as said tip means rotates with respect to said base means.

12. Apparatus as set forth in claim 11 wherein said sensor means is a load cell.

13. Apparatus as set forth in claim 12 wherein means are provided to apply a predetermined pressure to said load cell.

14. Apparatus as set forth in claim 13 wherein means are provided to limit the pressure which may be applied to said load cell.

15. In an automatic welding and wire feed system in which a weld pool is formed in a base material during a welding process, a welding wire positioning mechanism for maintaining the tip of a welding wire adjacent said weld pool in aligned relation with and at a predetermined set pressure relative to a point on said base material, comprising:
   support means for supporting said welding wire in said aligned relation with said point on said base material;
   and sensing means for sensing deviations from said predetermined set pressure, said sensing means disposed for providing electrical signals responsive to said pressure deviations, whereby said automatic welding and wire feed system compensates for said deviations from said predetermined pressure by corrective movement of said support means.

16. A device as set forth in claim 15 wherein said sensing means is a load cell.

* * * * *